(12) United States Patent
Franz (10) Patent No.: US 8,276,960 B2
(45) Date of Patent: Oct. 2, 2012

(54) DEVICE AND METHOD FOR SEIZING AND SETTING DOWN IMPACT-SENSITIVE SHEETS

(75) Inventor: Roland Franz, Fünfstetten (DE); Kornelia Franz, legal representative, Fünfstetten (DE)

(73) Assignee: Grenzebach Maschinenbau GmbH, Asbach-Bacumenheim (DE)

( * ) Notice: Subject to any disclaimer, the term of this patent is extended or adjusted under 35 U.S.C. 154(b) by 431 days.

(21) Appl. No.: 12/599,038

(22) PCT Filed: May 6, 2008

(86) PCT No.: PCT/DE2008/000759
§ 371 (c)(1),
(2), (4) Date: Nov. 5, 2009

(87) PCT Pub. No.: WO2008/135032
PCT Pub. Date: Nov. 13, 2008

(65) Prior Publication Data
US 2010/0303600 A1 Dec. 2, 2010

(30) Foreign Application Priority Data

May 8, 2007 (DE) .......................... 10 2007 021 494

(51) Int. Cl.
*B25J 15/02* (2006.01)
(52) U.S. Cl. ........ 294/197; 294/207; 294/907; 414/741; 414/806
(58) Field of Classification Search ................. 294/207, 294/197, 198, 103.1, 907; 901/46, 47, 33–35; 700/213; 414/800, 806, 741, 801, 789.8, 414/792.9, 792.8
See application file for complete search history.

(56) References Cited

U.S. PATENT DOCUMENTS

| | | | | |
|---|---|---|---|---|
| 3,098,673 A | * | 7/1963 | Carlesimo | 294/63.1 |
| 3,411,639 A | | 11/1968 | Dryon | |
| 4,266,819 A | * | 5/1981 | Pemberton | 294/197 |
| 4,484,855 A | * | 11/1984 | Inaba et al. | 414/736 |
| 4,673,325 A | | 6/1987 | Jago | |
| 5,632,595 A | | 5/1997 | Mori et al. | |
| 6,039,375 A | * | 3/2000 | Bauman | 294/119.1 |
| 2004/0086368 A1 | * | 5/2004 | Downs et al. | 414/741 |

FOREIGN PATENT DOCUMENTS

| | | |
|---|---|---|
| DE | 1756787 | 8/1970 |
| DE | 10 2004 057 228 | 11/2004 |
| DE | 10 2007 021 494 | 11/2008 |
| EP | 1 695 928 | 8/2006 |
| JP | 06227655 | 1/1993 |

* cited by examiner

*Primary Examiner* — Saul Rodriguez
*Assistant Examiner* — Gabriela Puig
(74) *Attorney, Agent, or Firm* — Duane Morris LLP; J. Rodman Steele, Jr.; Gregory M. Lefkowitz (57) ABSTRACT

A device, method and computer readable-storage for mechanically handling impact-sensitive sheets of various formats ready for dispatch is described. The device has the following features: a) a control device in the form of a multi-axis robotic arm connected to a gripper device and means for mechanically gripping the sheets; b) the gripper device is hinged onto and suspended from the control device at a gentle incline by means of an adjustable damping device; c) the gripper device has sliding sections for the relative displacement of the means for mechanically gripping the sheets; d) the gripper device has means for determining the geometric dimensions of the sheets to be seized and for determining their set-down position; e) the gripper device has means for determining the exact positional co-ordinates of the set-down position; and f) the gripper device has means for gently feeding and depositing the sheets in the set-down position.

19 Claims, 7 Drawing Sheets

DEVICE AND METHOD FOR SEIZING AND SETTING DOWN IMPACT-SENSITIVE SHEETS

CROSS-REFERENCE TO RELATED APPLICATIONS

This application is a §371 national stage entry of International Application No. PCT/DE2008/000759, filed May 6, 2008, which claims priority to German Patent Application No. 10 2007 021 494.6, filed May 8, 2007, both of which are hereby incorporated by reference.

BACKGROUND

The invention relates to a device and a process for mechanically grasping and setting down impact-sensitive plates of various formats on a stack arrangement such that they are ready for dispatch.

The production and sale of plates of various materials require special care when large and thin plates are involved. A particularly sensitive material in this respect is glass.

Despite the fact that it is taken for granted ubiquitously, flat glass processed to give window panes or auto glass is one of the most astonishing materials of our time. In contrast to hollow glass, it took several millennia longer until glass makers in the Middle Ages were able to produce flat glass panels that could be used for windows.

The most recent milestone in flat glass production was the development of the so-called float glass method in 1959. The novelty of the float method consists in the so-called "float ribbon". This consists of molten tin. This tin bath is about 4 to 8 meters wide and up to 60 meters long. In this method, the liquid glass floats on the ideally flat liquid tin. When the glass mass is drawn from the melting furnace onto the tin bath, the tin is at a temperature of 1000° C. At the end of the tin bath, when the now solidified glass ribbon leaves the tin bath, the tin is at a temperature of 600° C. Tin is the only metal which satisfies the conditions required for this method: these are those of already being liquid at 600° C. and still not developing any disturbing vapor pressure at 1000° C.

After the solidified glass ribbon has been divided into the required formats after it has left the tin bath, the glass surfaces obtained in this way have to be stacked in order to be transported further.

DE-AS 1 259 783 discloses a device for depositing glass plates, panels or similar objects and picking them up again, said device having a latticed pivoting frame which uses its support bars to grip between rollers in a roller table when in a horizontal position. This pivoting frame can be pivoted out of its horizontal position about an axis which is placed horizontally on one side to the roller table and is perpendicular to the roller axes of the roller table, and, on the side which faces away from its pivot axis, this frame bears grippers for holding the objects. This device is substantially based on the object of depositing objects from the pivoting frame from a horizontal position on a roller table both in a horizontal position on a box and in a substantially vertical position on a stand laterally next to the roller table.

This object is achieved in DE-AS 1 259 783 in that at least one gripper chuck, which can be pivoted as a whole about an axis parallel to the pivot axis of the frame, is coupled to the pivoting frame as the gripper, the gripper jaws of this chuck being movable symmetrically in opposite directions in order to support the pivoting frame, and in that the pivoting frame has extension supports which are arranged in its plane and in parallel between its support bars and can be extended and retracted toward that side which faces its pivot axis.

Although this known device is also used to set down impact-sensitive plates on a stack arrangement, this process still takes place without the use of a multi-axis robot arm.

DE-AS 17 56 787 discloses a device for shifting glass panels between a conveyor and a bearing block on which the glass panels are stacked in upright fashion, in which essentially one supporting frame, which receives the glass panels to be stacked and has holding heads for the lower side of the glass panels, is arranged on a movable slide, wherein the holding heads can be deposited below the support plane of the glass panels. The object in this case is to provide a device for removing glass panels from stacks, which makes it possible to rapidly shift even fracture-sensitive glass panels, which are stacked on a bearing block, to a conveyor which receives the glass panels horizontally.

This object is achieved in DE-AS 17 56 787 in that the supporting frame is coupled, above its transverse center line, in a freely suspended manner on a frame support arranged on the slide, and a holding device which flexibly holds the supporting frame at a slight inclination counter to the inclination of the stacked glass panels is arranged between the frame support and the supporting frame and, when the holding heads are abutted against, permits a resultant pivoting movement of the frame beyond the perpendicular. Although the supporting frame in this case is likewise freely suspended, the glass plates are transferred substantially from the vertical position into a horizontal position. No gripping device in the form of a multi-axis robot is provided here either.

DE 10 2004 057 228 A1, as the closest prior art, discloses a process and a device for the high-speed stacking of plates, in particular glass plates, guided along a plate conveyor; this is based on the object of making it possible to stack plates of this type more quickly.

SUMMARY OF THE INVENTION

In order to achieve this object, it is claimed in the process as claimed in claim 1 that the respective plate is lifted up slightly from the plate conveyor at a stacking station by producing suction pressure on the upper side of the plate, is then grasped by frictional engagement or in some other way likewise on the upper side of the plate while retaining the suction pressure acting on the upper side of the plate, and is moved away from the plate conveyor to a position above a stacking table where it is deposited on the plate table by releasing the suction pressure and/or by mechanical pressure on the upper side of the plate counter to the action of the suction force, with the stacking table being lowered by the thickness of a plate after each plate has been deposited.

The plate stacks deposited on the stacking table can then be conveyed further by a downstream receiving device in the form of a horizontal conveyor, which has a laterally movable fork with prongs which can be inserted beneath the plate stack in order to receive it, can pick up the stack through interspaces in the stacking table and can then be moved away from the stacking table position.

Another possibility is to design the receiving device with elements for grasping the upper side of the plate stack. A further possibility is to design the receiving device connected downstream of the stacking table in such a way that it removes the respectively stacked plate stack from the stacking table and transfers it to a stacking stand using an upright transfer robot, wherein the transfer robot has a gripper mechanism which grips the plate stack in the region of its upper edge. The latter type of mounting offers the best options for transporting the plate stacks to further-processing customers since it makes it possible to access plate stacks of various formats. However, an increase in productivity requires the turnover time to be shortened and a simultaneous desirable reduction in the fracture rate.

In this known stacking device, a control device in the form of a multi-axis robot arm has a gripping device and means for mechanically gripping the plates.

The device from DE 10 2004 057 228 A1 does not have a special embodiment of this gripping device.

The present patent application is based on the object of specifying a device and a process which make it possible to optimally stack impact-sensitive plates.

Multi-axis robot gripping arms are used in a very wide variety of technical fields where they serve, equipped with the widest variety of gripping tools and functional tools, for automatically carrying out the respective work.

In order to achieve the object on which it is based, the device is equipped, via a special gripping device in conjunction with a robot arm, with the following functional units:
 a) an integrated displacement slide,
 b) specially adjustable clamping jaws,
 c) a pneumatically adjustable pressure finger,
 d) special position sensors, and
 e) a special control program.

BRIEF DESCRIPTION OF THE DRAWINGS

The invention will be described in more detail with reference to the following figures. In detail.

DETAILED DESCRIPTION

Figure 1:
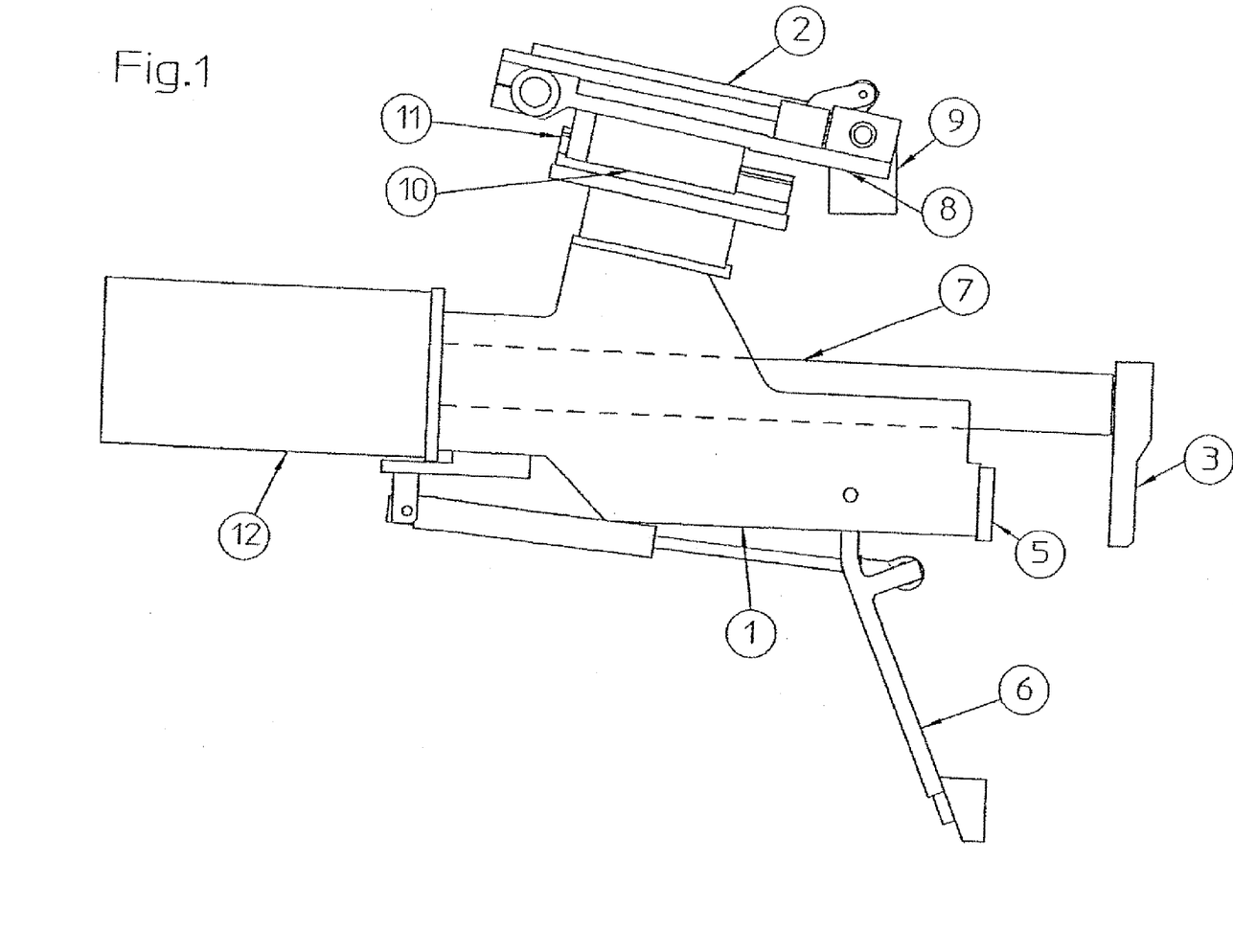
FIG. 1: shows a cross section of the constituent parts of the gripping device.

FIG. 1 shows a cross section, as seen from the side of the left-hand clamping jaw (7), of parts of the gripping device.

Figure 7:
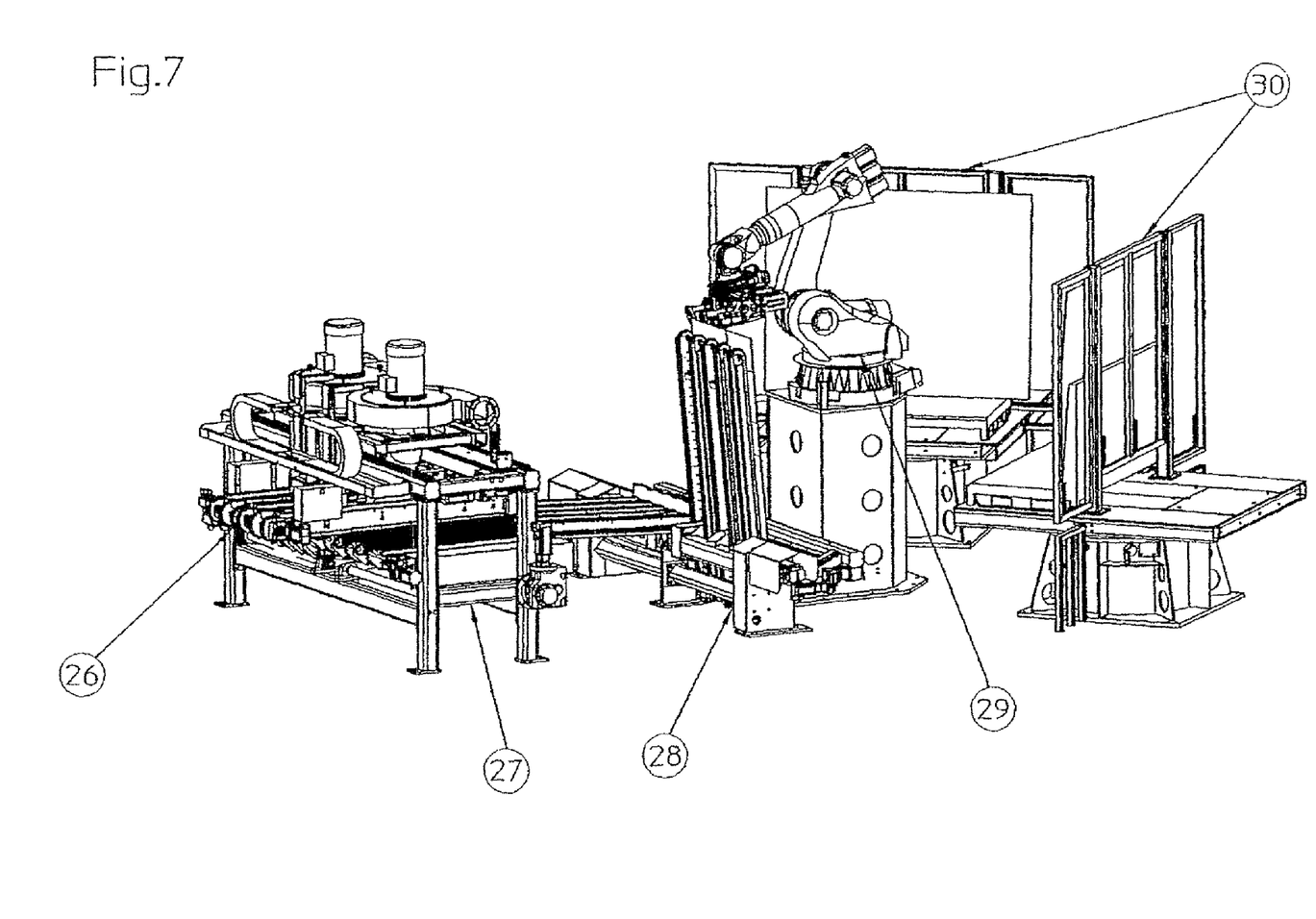
FIG. 7: shows the function on the production line.

The chassis (1) of the gripping device of the device is connected via the flange (2) to a multi-axis robot arm, which is not shown here but can be seen in the overall view from FIG. 7.

The tilting plate (8) is connected to the flange (2) via a stable axis of rotation D shown in cross section, in FIG. 1, in the form of two concentric circles and can be tilted in relation to the flange (2) via this axis of rotation. This tilting operation is carried out via the control of the tilting cylinders (9) which are assigned in terms of position to a respective clamping jaw (3) and (4).

The stack, which is to be grasped, of the plates to be conveyed is clamped via the clamping jaw bar (7) between the clamping jaw (3), which is on the left-hand side in the case shown, and the clamping jaw support (5) thereof. The force to be used for this purpose is applied via the working cylinder (12). The position of the associated right-hand clamping jaw (4) can be seen from the perspective illustration in FIG. 3. This right-hand clamping jaw (4) has a dedicated further working cylinder (12).

The hydraulically actuated pressure finger (6), which may also be provided in multiple numbers, stabilizes the position of the plates clamped in the clamping jaws (3) and (4). This is particularly important in the case of large plates and is explained in more detail in the statements relating to FIG. 2.

The integrated displacement slides (10) constitute one constituent part of the device. The entire gripper is fastened inclined at a slight angle of incidence, that is to say suspended slightly forward, in relation to the plane of the robot flange (2) via these displacement slides (10) which are assigned separately to each clamping jaw. This design measure affords two essential advantages.

Firstly, this measure provides protection against collision since, in the event of an unintended collision, the entire chassis (1) can recede in a specific region in relation to a specific position of the robot arm and simultaneously rotate about the above-mentioned stable axis of rotation D. For this purpose, it is merely necessary to displace the displacement slides (10) against an adjustable spring force and overcome the counterforce built up by the tilting cylinders (9).

Secondly, this measure makes possible the positionally accurate and gentle movement of the plate stack in the gripper onto stacks which have already been set down. As a result of this, firstly the stacks are not pressed against one another and destroyed by unintentionally high setting forces and secondly the stacks can be stacked behind one another without an undesirable interspace.

Figure 2:
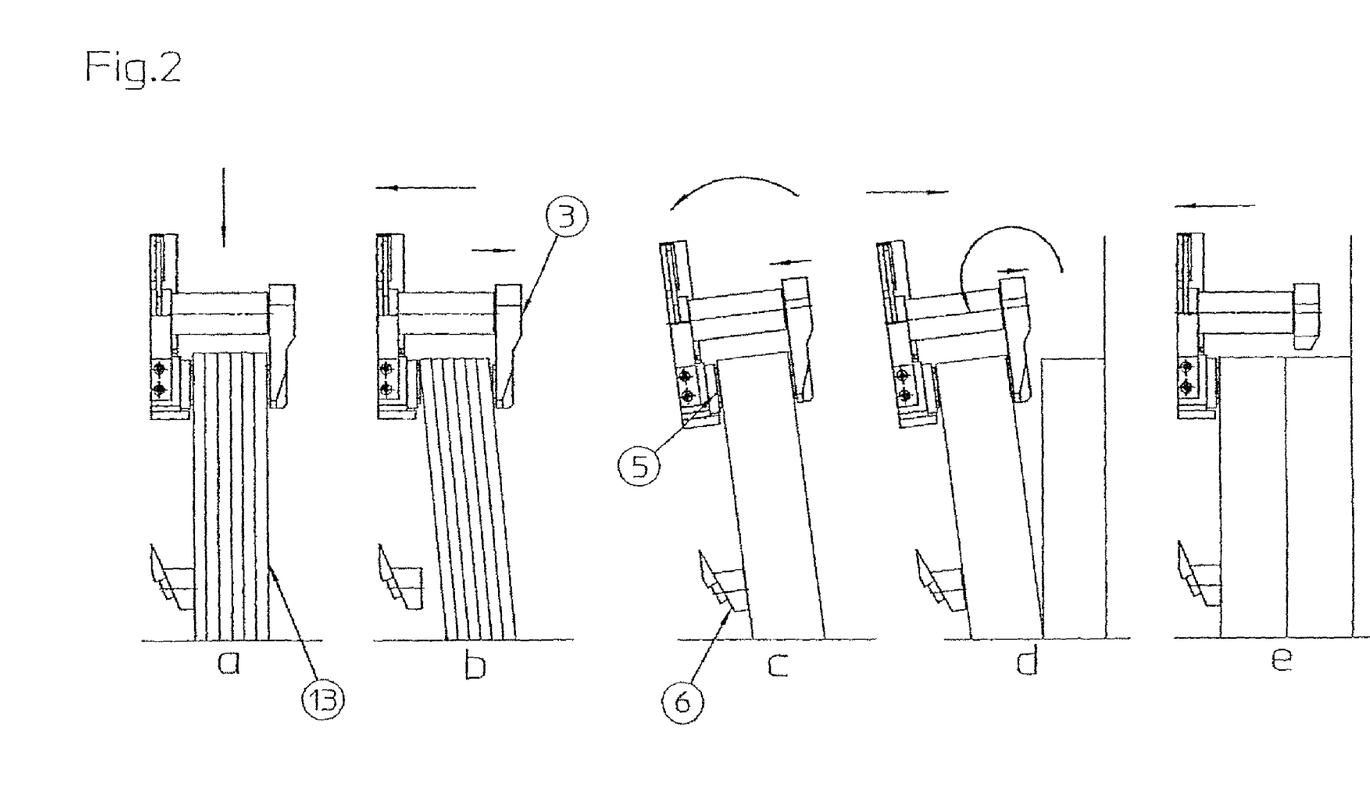
FIG. 2: shows some characteristic gripping processes.

The characteristic gripping processes shown in FIG. 2 are preceded by the device being guided along a glass stack (13). For this purpose, the slides (10) are unlocked pneumatically such that the entire gripper is held in its front position which is predefined by the design-induced inclination of the flange (2) and is stabilized via the force of gravity. The clamping jaws (3) and (4) are then rotated upward and the gripper is moved toward the glass stack (13) to be transported.

If the gripper then comes into contact with the set-down glass stack (13) as it is guided along, this pushes the gripper, or the clamping jaw supports (5), to the rear counter to the direction of movement until the robot movement is stopped and the position reached is stored.

The clamping jaws (3) and (4) are rotated downward, the glass stack (13) is clamped in and the thickness of the glass stack (13) is determined via the distance achieved between the clamping jaws and the clamping jaw support (FIG. 2a). After the plates to be transported have been guided along to the vicinity of the final set-down position, these are deposited virtually without any impact.

For this purpose, after the collet chucks (3) and (4) have been loosened, the gripping device is moved back by a specific distance in the direction which leads away from the positioning location, and the glass stack (13) is thereby tilted by a small angle by the collet chucks. The respective distance over which the gripping device moves back depends on the previously determined thickness of the glass stack (13) and is predefined by program technology (FIG. 2b)

In order to prevent the inclined glass stack (13) from fanning out, one or more pressure fingers (6) are moved on 2 to the lower parts of the surface of the respective glass stack (13). At the same time, the gripper is pivoted such that the clamping jaws (3) and (4) are aligned parallel to the surface of the inclined glass stack (13) (FIG. 2c). As a consequence, the glass stack (13) is grasped by the clamping jaws (3) and (4) with a specific contact pressure and positioned on the bottom edge of the rear wall of the positioning container together with a pressure finger (6). The corresponding positional coordinates were determined beforehand (FIG. 2c).

The clamping jaws are then pivoted upward out of the positioning region and the glass stack (13) is pressed into the end position by the clamping jaw supports (5) (FIG. 2e). This process ensures that the glass plates rest on one another as tightly as possible.

Figure 3:
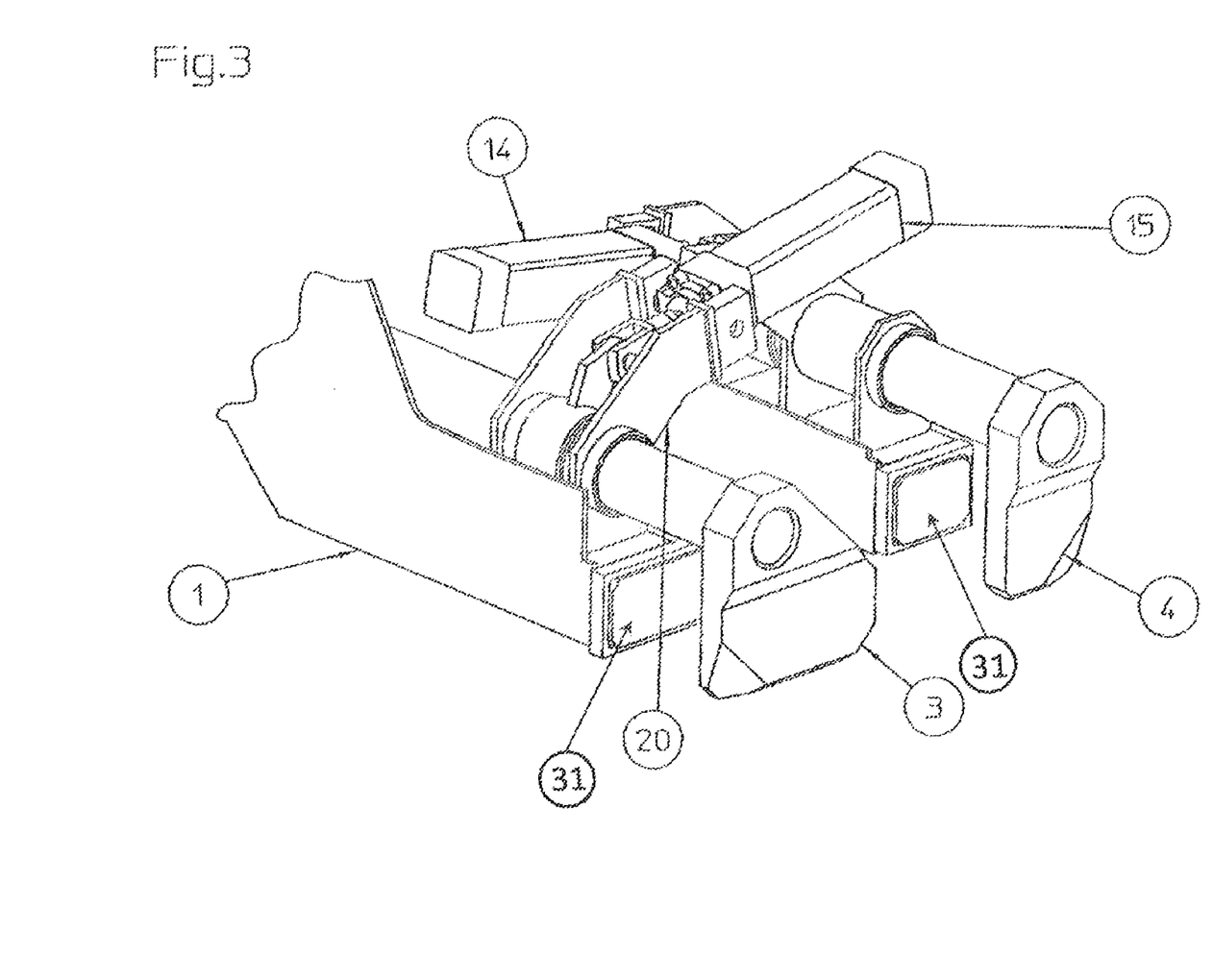
FIG. 3: shows the pivoting cylinders for the clamping jaws.

FIG. 3 shows the clamping jaws (3) and (4) with their respective pivoting device. The pivoting cylinder (14) is set up for the pivoting operation of the right-hand clamping jaw (4) and the pivoting cylinder (15) is set up for pivoting the left-hand clamping jaw (3). The perspective view also shows the holder (20) of the pivoting cylinder (15) and part of the chassis (1).

Figure 4:
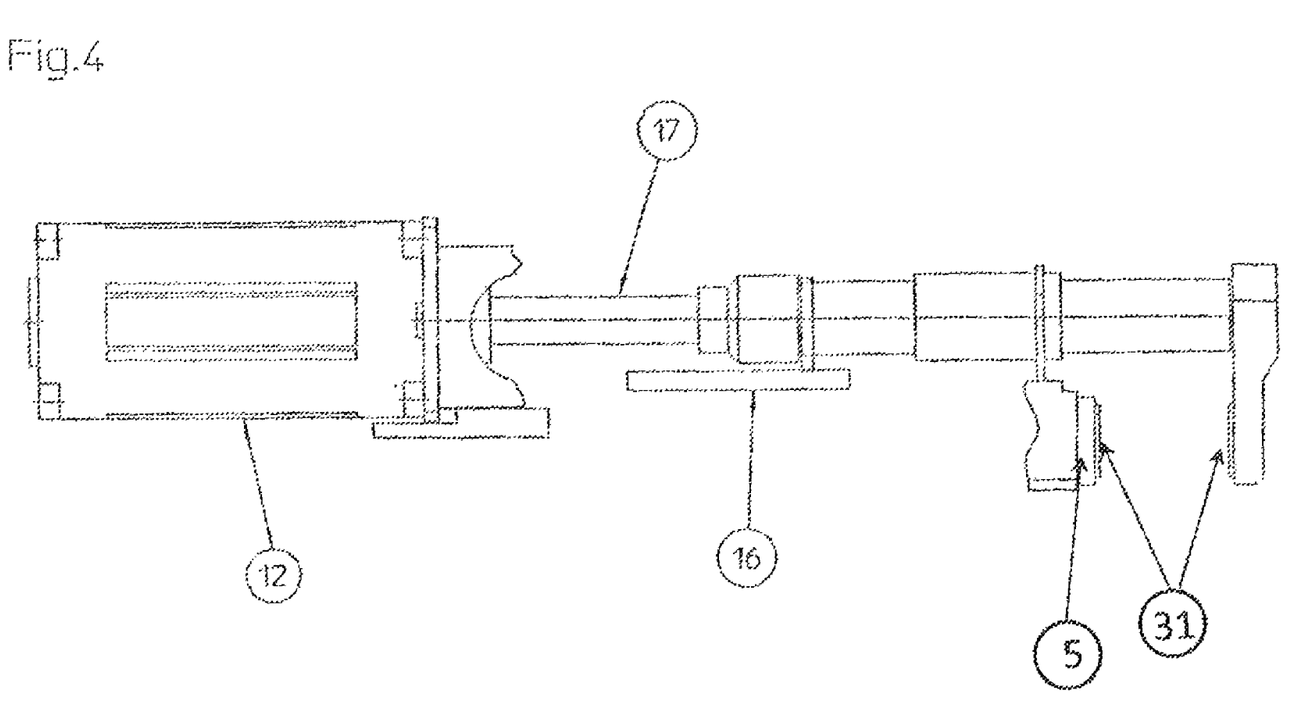
FIG. 4: shows the cross section of a clamping jaw.

FIG. 4 shows the functional elements which are operatively connected to a clamping jaw. Here, the working cylinder (12) uses the piston rod (17) to move the relevant clamping jaw (3) or (4), forward or backward as required. The thickness of the glass stack (13) which is grasped between the respective clamping jaw and the relevant clamping jaw support (5) is detected by the thickness measuring device (16) and processed further by data technology.

The clamping jaw supports (5) can be coated with a coating layer (31). The coating layer (31) can include a composite of cellular rubber, or a material with similar elasticity behavior, and a plastic, wherein the coating layer (31) represents the surface which makes direct contact with the plates 13.

Figure 5:
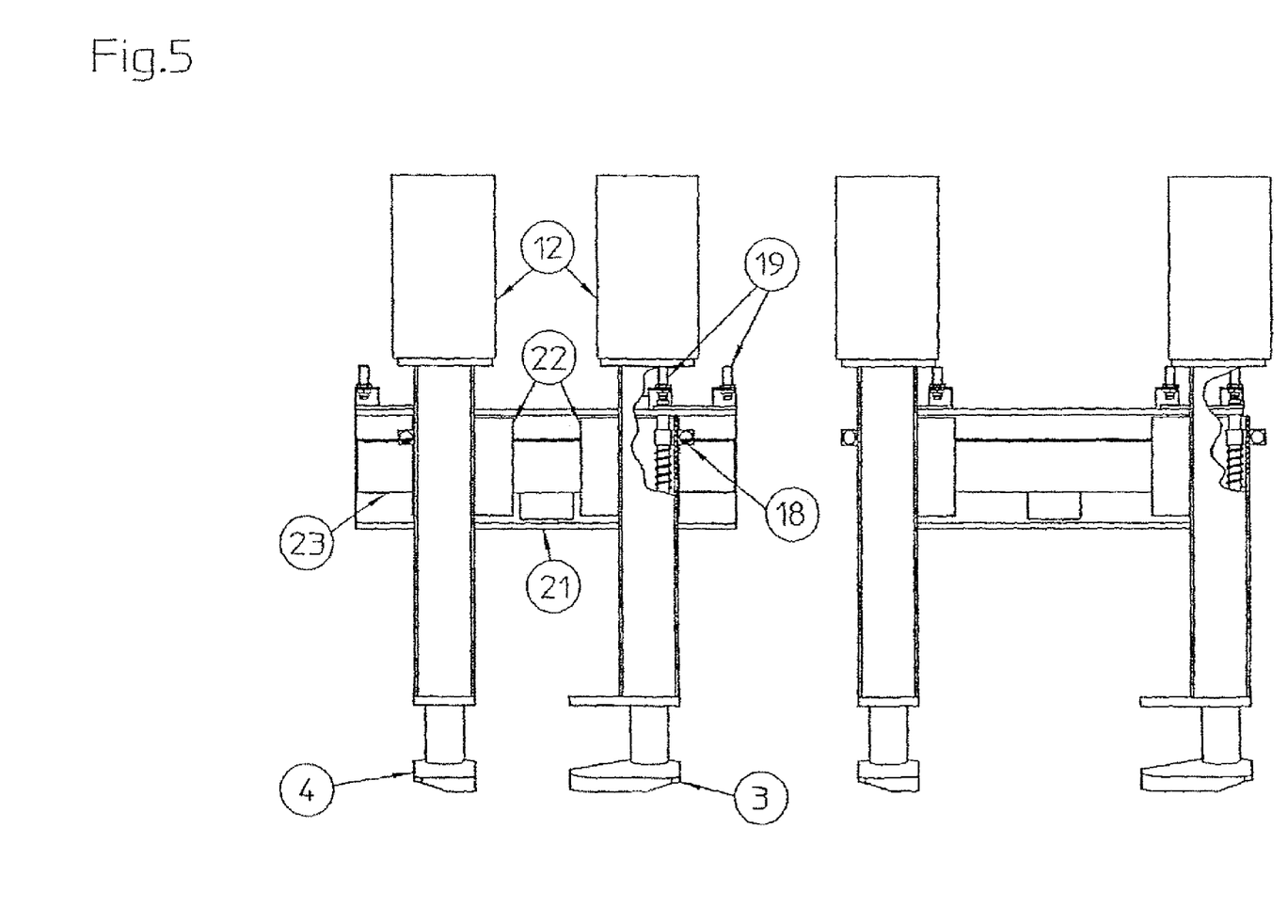
FIG. 5: shows a plan view of the displacement unit of the clamping jaws.

FIG. 5 shows a plan view of the displacement slides (22) assigned to each clamping jaw. In the illustration on the left, the spacing between the two displacement slides (22) is small, and the illustration on the right shows a correspondingly larger gripping region of the clamping jaws (3) and (4). This illustration also shows the respective working cylinders (12) assigned to the clamping jaws. Both the displacement slides (22) are guided on the cross piece (21) for the displacement device over the displacement rail (23). The position of the displacement slides (22) is fixed via the respective locking system (18). Both the illustration on the left and that on the right of FIG. 5 show "cut-away detailed drawings" in the region of the locking systems (18). One of these locking systems can be seen in the side view of FIG. 6.

Figure 6:
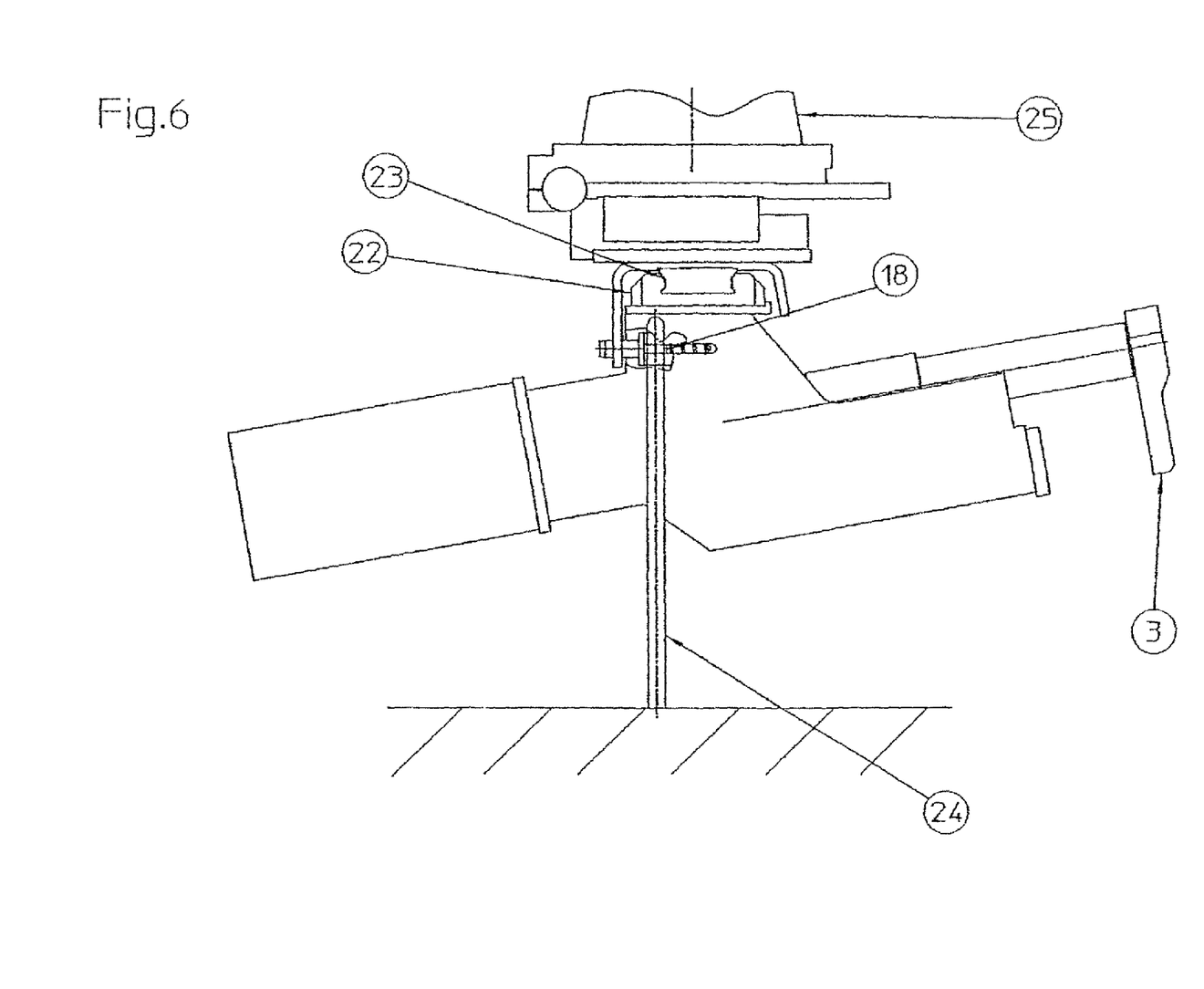
FIG. 6: shows a sectional drawing of details of the displacement unit.

Here, the use of an unlocking finger (24) causes the spring-loaded locking of the respective displacement slide, (22) to be, released and, in conjunction with a corresponding horizontal movement of the robot (29), causes the displacement slide to be moved to the desired location. For this purpose, the gripper has to move in a static conversion device and adjust the width of the clamping jaws one after another. The position of the respective displacement slide (22) which is reached in this way is fixed by removing the unlocking finger (24). The position sensors (19) register the position of the displacement slides (22) and thus represent the basis for detecting the position thereof by data technology. The sensors (19) can be ultrasonic sensors and/or sensors on the basis of electromagnetic processes and/or sensors that operate with electromagnetic waves.

FIG. 6 shows a side view of details of the mechanism for displacing the clamping jaws. This additionally shows the robot arm (25).

FIG. 7 shows the position of the device in association with the entire production line. The aligning unit (26), which is used to align the individual plate formats, is followed by the stacking unit (27) and the transfer unit (28), from which the glass stacks to be aligned for transport are picked up. The robot (29) can then distribute the glass stacks onto different stacking stands (30).

Since the upper side with which the individual glass plates are positioned on the respective stacking stand (30) may play an important role for the further processing of these plates, the robot (29) may grip the plates positioned on the transfer unit (28) from the front side or the rear side. This is because, since each glass plate is produced on a liquid tin bath, it has a so-called bath side and a so-called air side. It is usually only possible to use the air side for any type of subsequent coating.

The gripper can be held so tightly that the glass stacks can be gripped and additionally also rotated in three different ways, specifically from above and from each side, which results in a total of six different ways of accessing the glass stacks.

If a specific orientation of glass plates is additionally required, this can be taken into account by the robot (29) by means of corresponding rotation through 90 degrees on the vertical.

In order to save weight, the gripping device may be composed of lightweight materials such as, for example, aluminum, GFP or titanium. The weight saved in this way can consequently be invested in an electromechanical displacement device of the slides (22). This makes it possible to adjust the width of the clamping jaws required in each case more quickly.

Two devices according to the solution can also be used for grasping various plate formats more quickly, one such device preferably being set up for grasping larger stacks and the other, by contrast, being set up for grasping smaller plates.

The computer program with a program code for carrying out the process, and a machine-readable storage medium for storing the computer program with the corresponding program code, likewise form part of the solution.

LIST OF REFERENCE NUMERALS (1) Chassis
(2) Flange for robot arm
(3) Left-hand clamping jaw
(4) Right-hand clamping jaw
(5) Clamping jaw support
(6) Pressure finger
(7) Clamping jaw bar
(8) Tilting plate
(9) Tilting cylinder
(10) Displacement slide
(11) Rail
(12) Working cylinder for clamping jaws
(13) Glass stack
(14) Right-hand pivoting cylinder for clamping jaws
(15) Left-hand pivoting cylinder for clamping jaws
(16) Thickness measuring device
(17) Piston rod of a working cylinder
(18) Locking system
(19) Position sensors
(20) Holder of a pivoting cylinder
(21) Cross piece for the displacement device
(22) Displacement slide
(23) Displacement rail
(24) Unlocking finger
(25) Robot arm, control device
(26) Aligning unit
(27) Stacking unit
(28) Transfer unit
(29) Robot
(30) Stacking stand
(31) Coating layer

The invention claimed is:

1. A device for mechanically grasping and setting down a plurality of impact-sensitive plates of various formats on at least one stack arrangement such that they are ready for dispatch,
   said device having the following features:
   a) a control device in the form of a multi-axis robot arm (25) having a gripping device and means for mechanically gripping the plates,
   b) the gripping device is coupled to the control device such that it is suspended in an inclined position by means of an adjustable damping device (9),
   c) the gripping device has slides (22) for displacing the means for mechanically gripping the plates,
   d) the gripping device has means for determining the geometric dimensions of the plates to be grasped and for determining a set-down position of these plates,
   e) the gripping device has means for determining the positional coordinates of the set-down position, and
   f) the gripping device has means for guiding the plates to the set-down position and depositing said plates there, wherein said plates are gripped by clamping an upper portion of the plates between at least one clamping jaw (3,4) and a clamping jaw support (5) opposite said at least one clamping jaw (3,4); wherein one or more pressure fingers (6) are used as means for preventing a plate stack from fanning out, wherein said one or more pressure fingers (6) are independently actuatable.

2. The device as claimed in claim 1, characterized in that one or both sides of the clamping jaw supports (5) are coated with a layer comprising a composite of cellular rubber, and a plastic, wherein the plastic represents the surface which makes direct contact with the plates.

3. The device as claimed in claim 1, characterized in that the gripping device is coupled to the control device such that it can be tilted at an angle of 5 degrees to 20 degrees.

4. The device as claimed in claim 3, characterized in that the adjustable damping device (9) can take over at least a large part of the weight of the gripping device.

5. The device as claimed in claim 1, characterized in that movements of the robot arm (25) unlock and/or fix the slides (22) for displacing the clamping jaws (3) and/or (4).

6. The device as claimed in claim 1, characterized in that it has sensors for acquiring all the data required for the movement sequences which occur.

7. The device as claimed in claim 6, characterized in that the sensors are ultrasonic sensors and/or sensors on the basis of electromagnetic processes and/or sensors that operate with electromagnetic waves.

8. The device as claimed in claim 1, characterized in that, in order to reduce weight, the gripping device is composed in part or entirely of lightweight materials such as GFP, aluminum or titanium.

9. The device as claimed in claim 1, characterized in that the slides (22) for the relative displacement of the means for mechanically gripping the plates are unlocked and/or reset and/or locked again by electromechanical means.

10. The device as claimed in claim 1, characterized in that, when a plurality of plate stacks (13) are placed one on top of the other, the control device can select bearing strips suitable for deposition between two plate stacks (13) from a corresponding store.

11. The device as claimed in claim 1, wherein the at least one clamping jaw (3,4) is slidably displaceable relative to said clamping jaw support (5).

12. The device as claimed in claim 1, wherein said at least one clamping jaw (3,4) is rotatable away from an upper positioning region of the plates such that the clamping jaw support (5) can press the inclined plates into the set-down position.

13. The device as claimed in claim 1, wherein said clamping jaws are aligned parallel to a surface of the plates when the plates are gripped.

14. The device as claimed in claim 1, wherein the gripping device is coupled to the control device such that it can be tilted at an angle of 7 degrees to 10 degrees.

15. The device as claimed in claim 1, further comprising a computer-readable storage for causing the device to mechanically grasp and set down a plurality of impact sensitive plates of various formats on at least one stack arrangement such that they are ready for dispatch.

16. A process for mechanically grasping and setting down impact-sensitive plates of various formats on at least one stack arrangement, such that they are ready for dispatch, by means of a control device in the form of a multi-axis robot arm which has a gripping device for mechanically gripping the plates,
   said process having the following process steps:
   a) the geometric dimensions of the plates (13) to be transported are determined and the plates (13) are gripped via at least one collet chuck (3, 4),
   b) the plates (13) to be transported are guided to a set-down position and deposited there,
   c) the at least one collet chuck (3, 4) is loosened,
   d) the gripping device is moved back by a distance in a direction which leads away from the positioning location, as a result of which the plates (13) are tilted by an angle,
   e) at least one pressure finger (6) is guided along the lower parts of the surface in order to prevent the inclined plates (13) from fanning out,
   f) at least one collet chuck (3, 4) grips the compact stack of inclined plates (13), and the stack is then guided and deposited in flush fashion on the bottom edge of the set-down position, and
   g) the at least one collet chuck (3, 4) is rotated away from the upper positioning region of the plates and the inclined plates are then pressed against the rear wall of the positioning region.

17. The process as claimed in claim 16, characterized in that, before the positioning operation, suitable bearing strips from a store containing various bearing strip formats are automatically placed on the previous layer of plate stacks as an intermediate layer when a plurality of plate stacks (13) are placed one on top of the other.

18. A computer readable storage with a program code for carrying out all of the process steps as claimed in claim 16 when the program code is executed on a computer.

19. A computer program with a program code, which is stored on a machine-readable storage medium, for carrying out the process as claimed in claim 16, if the program is executed on a computer.

* * * * *